(12) United States Patent
Vasquez

(10) Patent No.: US 11,495,226 B2
(45) Date of Patent: Nov. 8, 2022

(54) SYSTEM AND METHOD FOR CONFIGURABLE CONTROL OF VOICE COMMAND SYSTEMS

(71) Applicant: DISNEY ENTERPRISES, INC., Burbank, CA (US)

(72) Inventor: Noel Brandon Vasquez, New York, NY (US)

(73) Assignee: Disney Enterprises, Inc., Burbank, CA (US)

(*) Notice: Subject to any disclaimer, the term of this patent is extended or adjusted under 35 U.S.C. 154(b) by 188 days.

(21) Appl. No.: 16/928,769

(22) Filed: Jul. 14, 2020

(65) Prior Publication Data

US 2022/0020363 A1 Jan. 20, 2022

(51) Int. Cl.
*G10L 15/22* (2006.01)
*G06F 3/16* (2006.01)
*G06F 16/432* (2019.01)
*G10L 15/26* (2006.01)

(52) U.S. Cl.
CPC .............. *G10L 15/22* (2013.01); *G06F 3/167* (2013.01); *G06F 16/433* (2019.01); *G10L 15/26* (2013.01); *G10L 2015/223* (2013.01)

(58) Field of Classification Search
CPC .......... G10L 15/22; G10L 15/26; G06F 3/167
See application file for complete search history.

(56) References Cited

U.S. PATENT DOCUMENTS 9,049,040 B2 * 6/2015 Latvakoski ........... H04L 67/125
2006/0265217 A1 * 11/2006 Bicego ..................... G10L 15/22
704/E15.04
2018/0329512 A1 * 11/2018 Liao ......................... G06F 3/167

* cited by examiner

*Primary Examiner* — Ibrahim Siddo
(74) *Attorney, Agent, or Firm* — Dorsey & Whitney LLP

(57) ABSTRACT

A method of providing configurable control of voice command systems is disclosed herein. The method comprising a parent device receiving a voice command and comparing the voice command to a set of preferences for a user. The set of preferences may relate to one or more interactions between the user and a playback device. The method further comprises the parent device translating the voice command to a user interface (UI) command sequence for the playback device based on the comparison. The playback device may then send the UI command sequence to the playback device as the configurable voice command. The playback device executes the UI command sequence to transition from the current output state to the desired output state intended by the user. A system for providing configurable voice control and computer program product are also disclosed.

20 Claims, 5 Drawing Sheets

SYSTEM AND METHOD FOR CONFIGURABLE CONTROL OF VOICE COMMAND SYSTEMS

BACKGROUND

In today's technological environment, electronic devices configured to play media files, such as videos, music, photos, games, etc., are often controllable by voice command, or at least provide some form voice control capability. However, voice command systems often provide users with a frustrating and non-intuitive voice control experience. One aspect that may feel non-intuitive, may be content searching and selection on an application-based playback device. Current playback devices may contain a multitude of applications or "apps" through which playable content is distributed by content providers to consumers. The disparate apps may each have highly differentiated user interfaces that differ greatly from one another. For example, each content application on a playback device may provide a graphical user interface in which content is displayed and navigated in a different manner from other content applications on the playback device. Meanwhile, the playback devices themselves must provide some form of generic or standardized voice command convention in order for the user experience to be consistent across applications The conflict between the generalized control of a playback device and the specialized functionality of applications stored thereon can result in a disjointed user experience, where users may consistently speak the incorrect voice command or where the correct voice command may not feel intuitive.

In addition, voice command systems may be difficult for novice users to use. In particular, children, who are usually unfamiliar with conventions, may find voice command systems extremely frustrating. Most voice command systems are not "kid-friendly," and are not designed with a child or "kid" user in mind. To make matters worse, novice users may generally be difficult for an automated system to understand. For example, children who are still in the process developing speech may be particularly difficult to understand. As a result, there exists a need for more intuitive and accommodating voice command systems.

Embodiments described herein address these problems and others, individually and collectively.

BRIEF DESCRIPTION OF THE DRAWINGS

The above-mentioned features of the present disclosure will become more apparent with reference to the following description taken in conjunction with the accompanying drawings, wherein like reference numerals denote like elements and in which.

DETAILED DESCRIPTION

Figure 1:
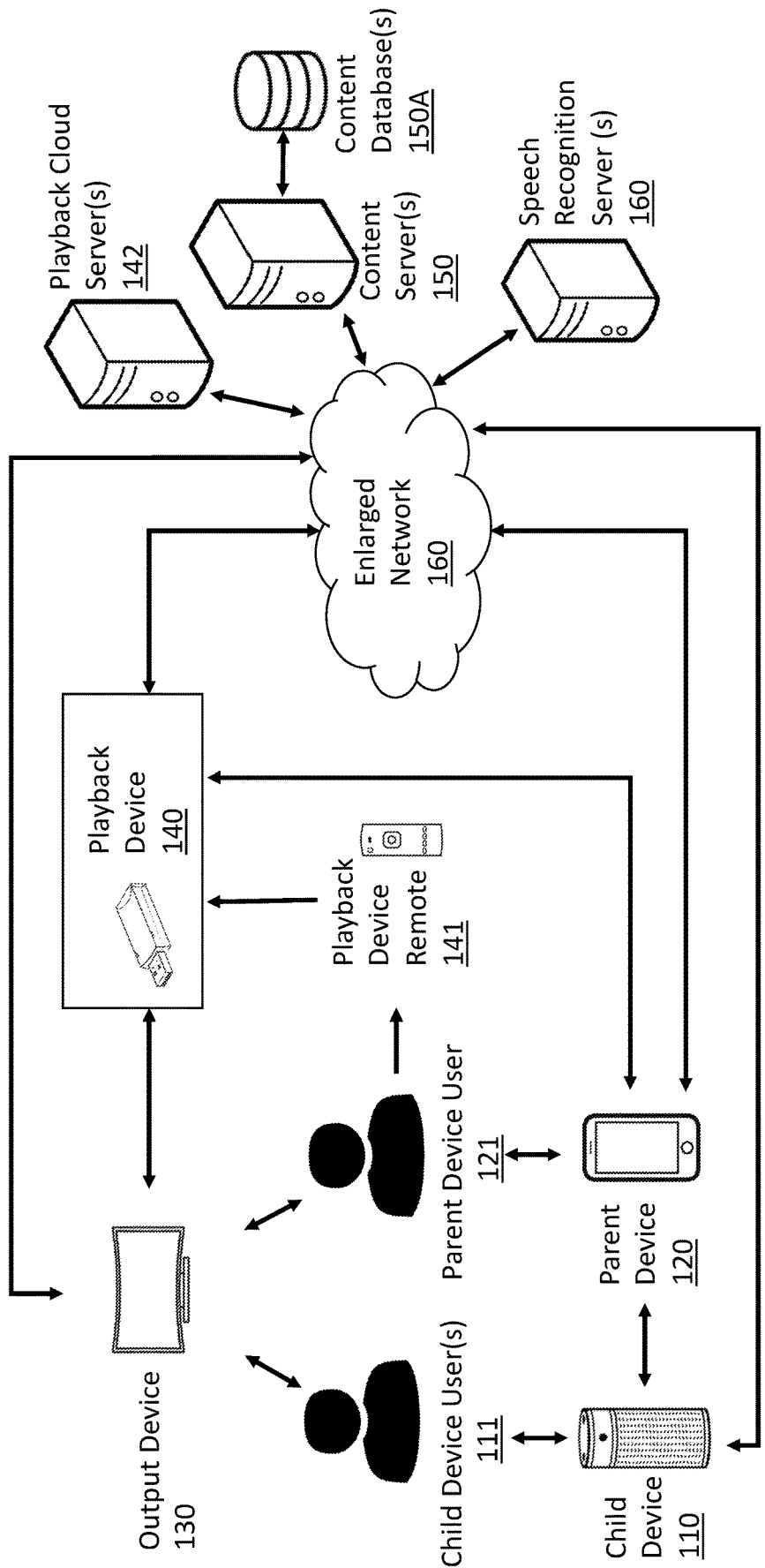
FIG. 1 illustrates a voice command system for accessing and playing media according to embodiments.

Before describing the invention in greater detail, it may be beneficial to provide some terms and definitions.

A "voice control device", "voice command device", "voice controllable system", or "voice command system" may refer to a device or system that is controllable through spoken inputs made by a user or that may enable voice-input functionality to users. For example, a voice control device may include a microphone for receiving audio input that can then be processed as natural language, such as through the conversion of speech into text or through other known forms of speech recognition software. A voice command system can also be used to describe an entire system for translating human speech or other audio input into machine-understandable commands and programmable control. Voice command systems may incorporate some form of natural language processing, as known in the art, typically for executing tasks that are specified using spoken input by a user. A voice command system may incorporate a voice-user-interface or "VUI", in order to provide the user with control. Examples of suitable voice command systems are described in greater detail in the detailed description further below.

A "parent device" may refer to an electronic device for delivering commands and executing tasks within a system. For example, a parent device can be used to process, configure, translate, send, receive, format, reformat, and forward voice commands within a voice command system. A parent device may be an application-based device, configured to provide control within a system using one or more applications. For example, a parent device may be a mobile device, such as a smart phone, tablet, laptop, wearable device, etc., comprising a "mobile application" for interacting with other devices in a voice command system, such as within a home, vehicle, entertainment system, or system of appliances or other connected machines (e.g. "internet of things" or "IOT" machines). Herein, a user or owner of the parent device may be referred to as a "parent device user."

A "child device" may refer to an electronic device configured to use a parent device as an intermediary. For example, a child device may be configured to use the parent device as an intermediary for communicating with other devices in a voice command system. As an example, a child device can be incorporated into a system of devices through interactions with a parent device that is already integrated into the system. In various examples, the parent device may be owned by the owner of a system, while child device(s) incorporated into the system may be owned and operated by the owner's guests, friends, roommates, flat mates, children, other family members, or other users within the vicinity. As described herein, a user or owner of the child device may be referred to as a "child device user."

A "playback device" may refer to a device for accessing, launching, and controlling playback of content. For example, the playback device may be an electronic device for playing media files or for streaming and playing back media files over a network. Some known examples include various "streaming devices". A "streaming device" may typically refer to an electronic device through which media content can be streamed through various media streaming services. Typically, the streaming device is an application-based device, in which each streaming service is made available through a particular application or "app." For example, each application on the streaming device may be a disparate application enabling communication with designated and disparate content servers, so as to retrieve content by a particular content provider. Furthermore, many streaming devices each incorporate its own generic VUI for selecting, launching, and closing applications, searching and browsing through content, and for navigating user interfaces. The VUI may be configured to process inputs according to a voice command convention that is specific to the manufacturer or provider of the playback device. In such examples, the streaming devices VUI is traditionally supported by a playback device server, which may be operated or used by the manufacturer or provider of the streaming device to provide cloud computing services to users of the playback device. In some instances, a VUI may be provided in the form of a "virtual assistant" that may interact with the user by processing voice commands and responding with computer-generated audio, namely in the form of a computerized voice. Some non-limiting examples of aforementioned streaming devices, as known in the art, include AppleTV, Roku, Amazon Fire TV, etc. In other examples, a user's mobile phone, tablet, laptop, or computer can act as a playback device, and may similarly be configured with the VUI of the playback device manufacturer or provider. Playback devices typically incorporate "playback controls", such as for pausing, playing, and stopping content, as well as for skipping, forwarding, or rewinding to different segments in content or to a different piece of content.

A "mobile computing device", or "mobile device", may generally refer to any electronic device that is portable, such as hand-held devices, lightweight devices, devices that can fit in a user's pocket, that can be held or placed on the user's lap, worn or carried around by the user, etc. Mobile devices often utilize wireless network capability to perform certain functions, namely for sending and receiving data messages over the internet, Bluetooth, SMS, or other wireless communications protocol. Specific examples of mobile devices may include phones, laptops, tablets, wearable "smart" devices, such as watches, glasses, wristbands, clothing, jewelry, etc. Said examples may communicate messages over 5G, 4G, 3G, LTE, or any other communications network, as known in the art.

A "recognition link" may refer to an association between an audio input and an assigned computer-registerable response to the audio input. For example, a recognition link may be a recorded input/output relation between voice input and a registered meaning of the voice input or recognized intent of the voice input. In one example, a recognition link may be a direct link between an audio file and a device command it is associated with. In another example, a recognition link may be a link between a voice command registered as audio and a corresponding voice command registered as text (e.g. as registered programmatically using an algorithm, such as a speech recognition algorithm, speech-to-text algorithm, or audio signature analysis). In yet another example, a recognition link may be a link between an audio input and output of a machine learning system or other form of predictive modeling used to make predictions about audio inputs through training or other mapping of inputs to predicted output. For example, a recognition link may be a mathematical function that is mapped using pattern recognition, such as through supervised or semi-supervised learning. Recognition links can be stored as records in a memory store of an electronic device or in a database.

A "restricted device feature" may refer to a capability of an electronic device that can be programmatically restricted in use, such that certain users may or may not have access to the capability. The user's access may be, for example, based on their specified permission level or based on some other criterion that must be satisfied, such as age or security clearance.

"Restricted media content" may refer to content that can be programmatically restricted in use, such that certain users may or may not have access to the media content. For example, some users may be prohibited from accessing adult content or media containing explicit material. In other examples, users may have privileges revoked, which may include the right to access certain media items. As another example, restricted media content may be content that is scheduled for public release at a later point in time or that may be limited to certain geographical locations or regions.

"Streaming" may refer to a type of delivery of data between two devices. In typical examples, streaming may refer to data that is delivered in a steady, and continuous flow over a computer network (e.g. between a client and a server). Namely, streaming often refers to network delivery of media data, such as audio, video, audiovisual content, text, and any corresponding metadata therefor (e.g. "music streaming", "video streaming", etc.). Streaming is often a preferable method of transmitting audio/video and other media files, as playback of earlier received portions of the media file is able to start even as the remaining flow of audio/video data (i.e. the audio/video "stream") is still being received or is still in transit. As an example, streaming can refer to data delivered according to a Real Time Streaming Protocol (RTSP), HTTP-based adaptive protocol, or other multi-media streaming format known and used in the art.

Continuing with a more detailed description of embodiments, FIG. 1 shows a voice command system. In particular, the system 100 shown in FIG. 1 illustrates a voice command system for accessing and playing media. In embodiments, the various devices integrated within the system 100 may be "connected" using a communications protocol, and referred to herein as "connected devices." The communications protocol may be a standard protocol for secure messaging, registration of devices, and transmission of media content between devices in a personal area network (PAN). The transmission of media content, including audio, video, images, metadata, input/output states, etc., may be enabled using a standardized multimedia protocol or a proprietary protocol that the connected devices may be configured to communicate with. Some non-limiting examples of communication protocols typically enabled for connected device communication include AirPlay, Cast, Miracast, Airfoil, AirParrot, to name a few. It should be understood, that the example protocols listed are merely illustrative examples of protocols that can be used.

The voice command system 100 includes a child device 110 operated by a child device user 111 and a parent device 120 operated by a parent device user 121. In embodiments, the child device can generally be any voice-control enabled connected device, such as a voice-controlled remote, mobile device, or smart speaker device. A "smart speaker", as currently known in the art, typically refers to an audio output device that may respond to spoken inputs. For example, a smart speaker may be a speaker device configured with "voice assistance", in which audio registered by a microphone may act as input to a virtual assistance program that delivers computer-generated responses to the user. In other examples, a child device 110 may be a handheld computing device that is voice-control enabled, such as a handheld remote control, tablet device, smart phone, gaming controller, etc. According to embodiments, a suitable parent device 120 may be a mobile computing device, such as a smart phone, laptop, tablet, wearable device, etc. Within system 100, the child device 110 and parent device 120 may communicate messages between one another through any suitable communication means, namely using a wireless communication protocol, such as Bluetooth, WLAN, WiFi, or other designated radio frequency (RF) signal, although other forms of wireless communication, wired communication, or combinations of various communication means may be used.

In embodiments, the child device 110 and parent device 120 may operate as two devices interacting according to a "child-parent" system architecture, in which the parent device 120 acts as a central point of control operable by the parent device user 121, and where the parent device 120 may act as an intermediary between the child device 110 and other connected devices, servers, and other child devices incorporated into the system 100. It is noted, that although only a single child device user 111 and parent device user 121 is shown, any number of users may be included for participation in system 100. Likewise, multiple child devices 110 and parent devices 120 may be incorporated into the voice command system 100. A parent device user 121 may be the main user of a system 100. The parent device user 121 may allow one or more "guests" or child device user(s) 111 to interact and integrate with the system 100. For example, the parent device user 121 may be the owner of the playback device 140, and the child device user(s) 111 may include friends, family members, and visitors that wish to operate the playback device 140 using voice input. As previously explained, the child device users 111 may include novice users that are unfamiliar with the voice command conventions of the playback device 140 or whose speech may not easily be understood by the VUI or virtual assistance program configured into the playback device 140 manufacturer/provider. As further described herein, embodiments may provide more intuitive voice command and control for the child device user(s) 110 through interactions and integrations managed through the parent device 120. Various embodiments include facilitating voice control by children, the elderly, users with foreign or heavily regional accents, to name a few examples.

In embodiments, the parent device user 121 may be the owner of one or more connected devices incorporated into system 100, some examples including, a plurality of devices connected as a personal area network or as a set of remote devices registered into a trusted network of the user, some examples including a smart home network, a fleet of internet-of-things (IOT) devices, or a set of devices provisioned with a central account of the parent device user 121 or linked to the parent device user 121's identity. In a particular embodiment, system 100 may be a home entertainment system, and the devices of system 100 may be synched together for playing back media content and for providing interactive entertainment. As such, the parent device user 121 may be able to switch back and forth between output devices, use multiple devices together to execute tasks, use one device to control another device within system 100, and so forth. For example, parent device user 121 may be able to switch or mirror outputs between devices, such as switching or mirroring the display of content from one display screen to another. In one example, the user may switch video outputs from a mobile phone screen to a TV screen. In another example, the user may switch audio outputs from a TV to a surround sound system. The parent device 120 may be configured to control playback of content on the playback device 140 (e.g. controlling content playback on a streaming device using a mobile device). Furthermore, as known in the art, a parent device may be configured to act as a keyboard for a playback device, such as for entering text into a search field of a graphical user interface (GUI). As such, the parent device 120 may be configured to receive user inputs and forward those user inputs as commands to the playback device 140. Similarly, the playback device 140 may communicate and synchronize input/output state information to the parent device and vice versa. For example, the input/output state information may comprise playback states, display states, UI navigation states, etc.

As mentioned, the system may comprise a playback device 140, which may be any multi-media or content playback device, such as those providing functionality for searching through, selecting, launching, and playing back content (i.e. pausing, playing, stopping, skipping forward or skipping backward, etc.). Examples of a playback device 140 may include various streaming devices. In other examples, a user's mobile phone, tablet, laptop, wearable augmented reality (AR) device, virtual reality (VR device), gaming console, or desktop computer can act as a playback device. The playback device 140 may support some form of interoperable device-compatibility with at least the parent device 120. For example, the playback device 140 may utilize Bluetooth, WiFi, or other wireless communication protocol in order to "sync" or "pair" with other devices. In other examples, the playback device 140 may be configured to "broadcast" and "listen" for broadcasts advertised over a wireless network by the other connected devices in the system 100. As such, the synching and broadcasting functionality may allow for device-to-device messages, forwarding of commands and other user inputs, pushing of notifications between connected devices, and the like. In some embodiments, the system 100 may further comprise playback cloud server 142, which may be a server operated by the device manufacturer of the playback device 140 in order to perform extended tasks remotely, allow for sharing of files within a user's account, and providing cloud computing functionality.

The playback device 140 may be an application-based device, in which content from various content servers 150 can be accessed using third-party applications. For example, the applications stored on playback device 140 may include video streaming applications, music applications, photo applications, gaming applications, and the like. The playback device 140 may be used to access or "stream" content retrieved from a content server(s) 150 over an enlarged network 160. The enlarged network 160 may be a large regional network or global network, such as the internet, for example. Although only pictured in FIG. 1 as a single server, content server 150 may include a plurality of servers and networks used for distributing and "streaming" content to one or more playback device(s) 140. For example, the content server 150 may be implemented as a combination of content provider servers and content delivery networks (CDNs). Furthermore, the content server(s) 150 may access content available for streaming that is stored in one or more content database(s) 150A. Content may include, for example, media content, such as movies, TV shows, music, books, audio books, digital newspapers, journals, games, or any other combinations of audio, video, images, 3D models, text, and media file metadata. In embodiments, information for available content may be retrieved from content databases(s) and provided to the playback device 140 for output on output device 130. The information can be provided by the playback device 140 as part of a displayable graphical user interface, where user selections to search, play, pause, stop, skip forward, back, etc. may initiate playback control of the corresponding content. Content streamed on the playback device 140 may be output (e.g. displayed) for consumption by users (e.g. child device user 111 and parent device user 121) of system 100 through output device 130. For example, the output device 130 may be a television or other display device for outputting audiovisual content viewable by the users. In another example, the output device 130 may be an audio device, such as a speaker. In some instances, the playback device 140 and output device 130 may be integrated into the same device. For example, the output device 130 may be a computing device with integrated playback capability, such as a smart TV, desktop, laptop, mobile phone, hand-held gaming console, etc. In one embodiment, the child device 110 and playback device 140 may be integrated as the same device. For example, the playback device 140 may be a smart speaker, game console, or tablet device comprising restricted device features.

In some embodiments, the playback device 140 may be controllable using a playback device remote 141, which may be a dedicated input control device for transmitting commands to the playback device 140, such as commands for playback control, graphical interface navigation (e.g. cursor directions), power, volume, and the like. In some embodiments, playback control may be provided to users as manual-input controls configured on playback device remote 141. Furthermore the playback device remote 141 may be a voice-input enabled device that is configured to receive, transmit, forward, and otherwise process voice commands of the playback device 140 in a manner specific to the voice command conventions established by the manufacturer or provider of the playback device and its VUI. In one example where the playback device 140 is an Apple TV device, the playback device remote 141 may be the Apple Siri Remote configured according to an Siri VUI. In another example, where the playback device 140 is an Amazon Fire TV device, the playback device remote 141 may be an Alexa Voice Remote configured according to an Alexa VUI. In one embodiment, a parent device 120 may share control features with the playback device remote 141, so that a user may selectively use the parent device 120 as the playback device remote 141. For example, the parent device 120 may comprise code for executing the VUI of the playback device remote 141.

As previously mentioned, voice command conventions for controlling a playback device 140 may require that voice inputs be organized into a predefined structure in order to elicit a pre-programmed response from the VUI. Often times the VUI may comprise a "virtual assistant", which may be a computerized voice used to deliver replies and other feedback to voice commands when delivered by the user in expected form and when containing voice inputs that are within the virtual assistant's knowledge base. For example, many VUIs require a hardware wake word to be spoken by the operating user, often times a greeting addressing the VUI, such as "Hello, 'name of virtual assistant'" (e.g. "Hey, Siri", "Okay, Google", etc.). The VUI may "listen" or expect the hardware wake word in order to register the voice inputs immediately following the wake word as the voice command. The virtual assistant may then compare the voice command to its knowledge base for known keywords and then map its knowledge of the keywords to the contents and structure of the voice command in order to output a response. As a simple example, a user may ask "Hello, virtual assistant. Who is Musical Artist X" and the virtual assistant may respond with "Musial Artist X is [insert knowledge base data of X]." Another example of a typical VUI convention includes following a spoken command with a spoken modifier describing the particular application, device, and/or room/location to initiate an action specified. For example, a user may say, "Play Musical Artist X on Video Application" or "Play Musical Artist X from Kitchen" or "Play Musical Artist X from Living Room TV," and the VUI may be configured to identify the application, device, or room that is registered to each modifier and then initiate playback of the specified content on the registered application, device, and/or room accordingly. As described herein, embodiments provide methods for configuring a voice command system so as to be controllable using voice commands that differ from the manufacturer's conventional VUI, including voice inputs being spoken in a format that does not adhere to the conventional VUI's structure or that may contain voice inputs that are not registered into a virtual assistant's knowledge base. Therefore, according to embodiments, users need not know or understand the voice command convention established by the manufacturers, and may instead control the voice command system 100 using commands that feel more intuitive to the user rather than being forced to follow a strict voice command convention.

The voice command system 100 may comprise a system of electronic devices controllable through spoken input. The spoken input can be processed within the voice command system 100 to provide functionality and execution of tasks by the devices involved. The tasks may include tasks relating to the search, selection, and playback of media content for consumption. For example, spoken inputs may be used to perform keyword searches, navigate graphical user interfaces, pause, play, stop, rewind, and skip forward through media content, etc. In some embodiments, system 100 may further comprise a speech recognition server 160 configured to process and recognize spoken inputs in the voice command system 100. Speech recognition server 160 may provide analysis of voice and recognition of speech and other audio by computers, such as, for example, using computer speech recognition, speech-to-text services (STT), and automated speech recognition (ASR) services, as known by those in the art. Said services may be accessible from the speech recognition server 160 using an application programming interface (API) or other form of request message called from any one of the one or more connected devices within the voice command system 100. Some non-limiting examples of commercial cloud-based speech recognition services and APIs, may include, for example, Cognitive Speech Services or similar cloud-based services as well as assistant-based natural-language speech recognition support, such as Assistant.ai, Dragon Dictation, Cortana, SILVIA, Vlingo, etc. In some embodiments, recognition of speech or analysis of audio can be performed directly on the audio itself, such as through waveform analysis. In some embodiments, at least some speech recognition may occur within the voice command system 100 without the use of the speech recognition server(s) 160.

In one implementation, child device user 111 may wish to consume content using output device 130, which may be a television display. The child device user 111 speaks a voice command relating to the desired content that is audible to the child device 110. The child device 110 may then forward the voice command to the parent device 120 for further processing, as described in greater detail below. For example, the parent device 120 may compare the voice command to a set of preferences relating to known or expected interactions between the child device user 111 and the playback device 140. Based on the comparison made on the parent device 120, an instruction can be sent to the playback device 140 commanding the playback device to transition from a current display state of the output device 130 to a specific display state within an application stored on the playback device 140 that corresponds to the child device user 111's mapped intentions, per the preference set evaluated on the parent device 120. For example, the preference set may comprise a mapping between voice commands historically spoken by the child device user 111 and display states of the playback device 140 that were arrived at by child device user 111. The preference set may comprise a combination of preferences set by the parent device user 121 and preferences suggested by the parent device 120. For example, the parent device 120 may provide a graphical user interface to parent device user 121 for setting device feature and content restrictions for child device users 111, setting preferred applications for playing content, preferred viewing devices, and viewing locations, and for viewing and setting suggested preferences inferred upon by the parent device 120 based on interactions between the child device user 111 and the playback device 140. The parent device user 121 may then make selections using the provided graphical user interface, and the selections may then be used by the parent device 120 to link voice commands to a corresponding preference. In various embodiments, this may include mapping a voice command to a preferred output state, such as a display state of the playback device or a desired navigation of a particular application UI on the playback device (e.g. scrolling and selection of content on an individual content application).

Furthermore, the parent device 120 may be configured to determine the required sequence of commands that will cause the playback device 140 to transition to the display states that are mapped. For example, the transition may be embodied as a sequence of text searches, user interface transitions, and playback commands initiated at the playback device 140 and may further include requests made to the content server(s) 150. In some embodiments, the parent device 120 may reference a user interface-flow diagram, and may identify a path from the current display state to the desired output state. As one example, the user interface-flow diagram may be implemented as a tree or graph structure, in which each command may be represented as a node that branches off into various output paths when performing a particular set of commands in sequence. In one embodiment, a shortest path algorithm may be used to traverse the graph and determine the command sequence path that optimally meets predefined criteria (e.g. shortest path, minimal latency, minimal central processing power, minimal graphics processing power, fewest display transitions, etc.). Some examples of suitable shortest path algorithms include Dijkstra's algorithm, Bellman-ford algorithm, topological sort, Floyd-Warshall algorithm, and Johnson's algorithm, to name a few. Upon making the transition, the corresponding content intended for consumption by the child device user 111 when speaking the voice command may then be output through the output device 130.

Figure 2:
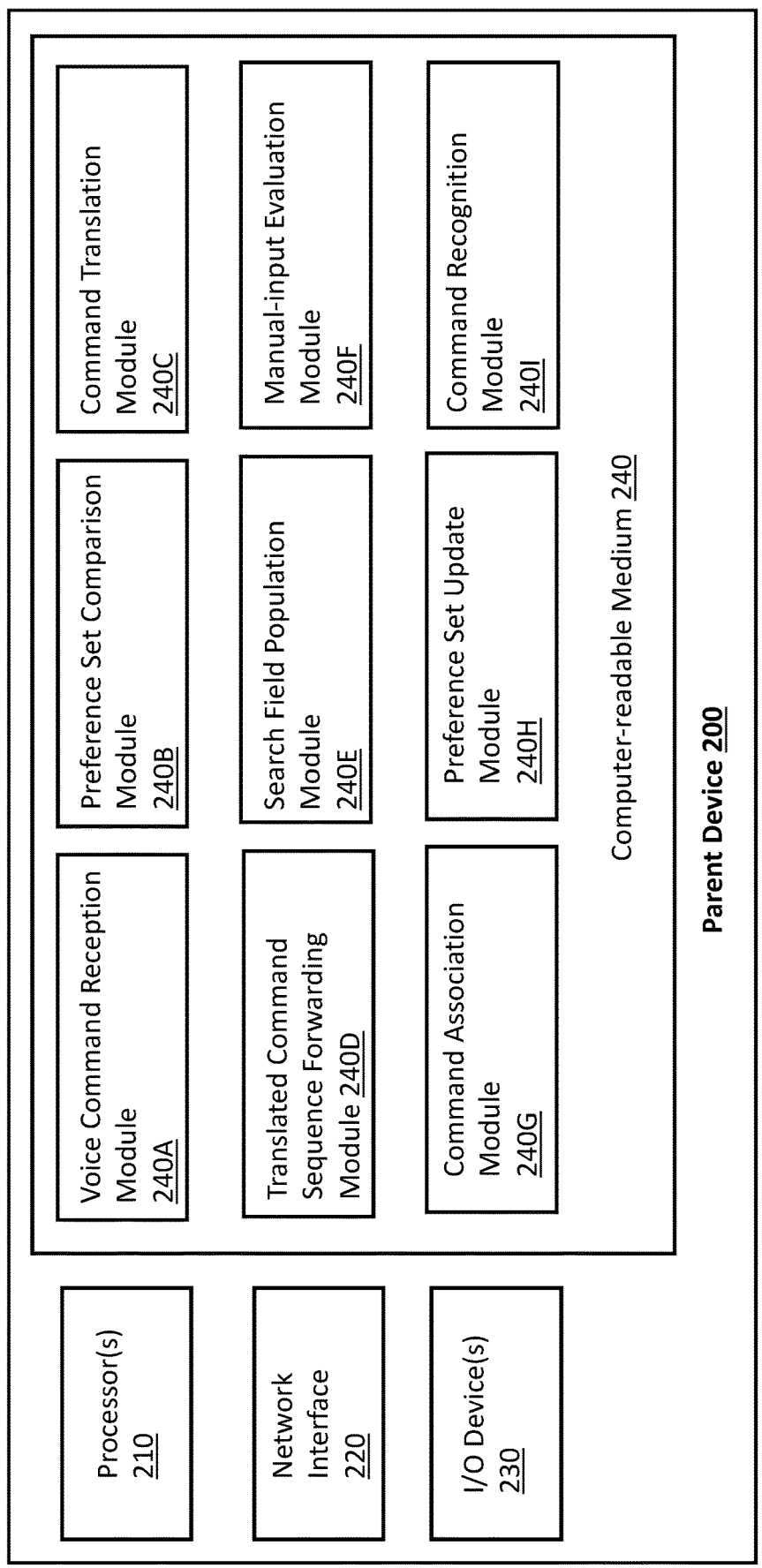
FIG. 2 illustrates a block diagram of a parent device according to embodiments.

To further describe the components and functionality of the parent device 120 of voice command system 100, FIG. 2 shows a block diagram of a parent device 200 according to embodiments. The parent device may comprise one or more processor(s) 210, at least one network interface, one or more input/output (I/O) device(s) 230, and at least one computer-readable medium 240. The processor(s) 210 may be any suitable computer processor for executing tasks and computer-readable instructions. For example, the processor(s) 210 can include one or more central processing units (CPUs), one or more graphics processing units (GPUs), or combinations thereof. The at least one network interface may be any suitable wired or wireless component for receiving, transmitting, forwarding, formatting, and reformatting data messages over a network, and in some implementations, according to a standard network communication protocol. Suitable communication protocols for transferring of messages and exchange of data may include Bluetooth, IP/TCP, RFID, NFC, USB, to name a few non-limiting examples. I/O device(s) 230 may include one or more hardware components allowing for input and output functionality. Examples of I/O device(s) 230 can include keyboards, microphones, display screens, touch screens, speakers, cameras, push buttons, knobs, sliders, keypads, light emitting diodes, haptic feedback devices, sensors (e.g. accelerometers, magnetometers, gyroscopes, etc.), and the like. As such, the I/O device(s) 230 allow for interaction between the parent device 200 and a user of the parent device 200, as well as interaction between the parent device 200 and the user's environment. It is noted, that any one of the I/O device(s) 230 may be integrated either in, or otherwise programmatically or physically coupled to, the parent device 200, and may further comprise one or more interfaces and drivers necessary for compatibility therewith.

Computer-readable medium 240 may be any non-transitory storage of computer code and data, such as a computer memory device. For example, the computer-readable medium 240 may include any combination of a random access memory (RAM), dynamic random access memory (DRAM), read-only memory (ROM), flash memory, external USB, hard drive, or memory card, etc. In embodiments, computer-readable medium 240 may store computer instructions for performing tasks as modules of computer code/program code executable by the processor(s) 210. As depicted in FIG. 2, computer-readable medium 240 comprises voice command module 240A, preference set comparison module 240B, command translation module 240C, translated command sequence forwarding module 240D, search field population module 240E, manual-input evaluation module 240F, command association 240G, preference set update module 240H, and command recognition module 240I.

Voice command reception module 240A may comprise code for receiving a voice command from other devices connected within system 100. In particular, voice command reception module 240A may comprise code for receiving a voice command from a child device, such as child device 110 depicted in FIG. 1 and child device 300 depicted in FIG. 3. The voice command reception module 240A may include instructions for the parent device 200 to receive a voice command generated at the child device 300, such as by receiving an audio file or text file over a local network. In one embodiment, the voice command reception module 240A may comprise instructions for the parent device 200/120 to scan a local network for the voice command, such as, for example, listening for advertisements broadcasted over a Bluetooth network or received over WiFi. Furthermore, the voice command reception module 240A may include instructions for the parent device to retrieve text for a voice command that originated at the child device. In one embodiment, the voice command reception module 240A may comprise instructions for the parent device 200/120 to retrieve converted voice inputs that originated from the child device 110/300 from a speech recognition server. For example, in one embodiment, the parent device 200 may be configured to receive speech-to-text outputs from a speech recognition server in communication with the child device.

Preference set comparison module 240B may comprise code for comparing a voice command to a set of preferences for a child device user. In embodiments, a set of preferences may be accessible or retrievable by an application on the parent device 200, either from local memory, through a remote database and server, or both locally and remotely. The set of preferences may relate to one or more interactions between a user and a playback device. For example, the preferences may comprise explicit interaction preferences specified by the child device user or by a parent device user. In other examples, the preferences may comprise tendencies of the child device user or other implicit pattern of behavior performed by a user when interacting with the playback device. In one embodiment, the set of preferences may include associations between content types and preferred applications on the playback device for accessing the content type. This may include a specification that a child device user prefers or tends to watch some content on a first application and may prefer/tend to watch other types of content on a second application on the playback device. In another embodiment, the set of preferences may include an association between content titles and specific applications on the playback device through which the content titles are available. For example, the set of preferences may include a populated list of content titles available on each content application stored on the playback device 140. In yet another embodiment, the set of preferences may include a preferred connected device of system 100 or a preferred viewing location registered to a device of system 100 that the child device user 111 prefers to consume specific content. For example, the child device user 111 may tend to watch content identified as "movies" on a television in the living room. In another example, the child device user 11 may tend to interact with content identified as "games" on a tablet device. In yet another example, the child device user 110 may tend to watch content marked as "cooking show content" on a display device registered to a kitchen location.

Furthermore, the set of preferences may include a description of the child device user 111's search and selection patterns. In one embodiment, the set of preferences may identify that the user typically names content based on characters, events, songs, or memorable quotes present in content. For example, the child device user may typically refer to a movie titled, "Mermaid Movie Title" by the name of the mermaid character's name. In another example, the child device user may typically refer to a TV sitcom or cartoon by speaking a catchphrase popularized by the TV show or by singing the TV show's theme song. Further examples may include other identifiable information about a piece of content, such as the setting, including time (e.g. "medieval", "dystopian future", etc.) and place (e.g. "Character's hometown X", "Fictional Planet Y", "New York City", etc.), or other relevant information that may be ascertained from consuming the content. In embodiments, the set of preferences may include links between spoken inputs of the child device user 111 and specific content titles and corresponding applications stored on the playback device 140 that contain the specific content titles. For example, the movie or TV show in the examples above may be available on "streaming application X" and the preference set may link the character names, quotes, or other spoken inputs used by the child device when referring to a content title and to the content application on which the content title is available (e.g. "Mermaid's name='play'+ 'Mermaid Movie Title' on 'streaming application X'"). In one embodiment, the preference set may comprise preferences of the child device user 111 that are set by the parent device user 121. For example, the preference set may include preferences to restrict a child's access to adult content or to restrict a guest user's access to private content on the playback device 140.

Figure 5:
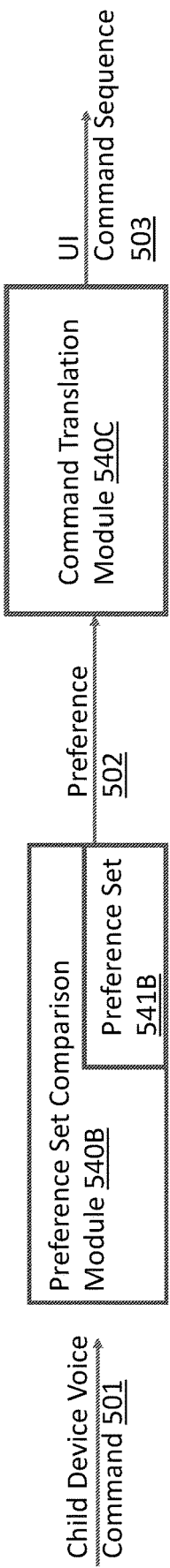
FIG. 5 illustrates a voice command translation by a parent device according to embodiments.

Command translation module 240C may comprise code for translating a voice command to a command sequence executable by a playback device. In embodiments, the translation may be based on the comparison of the voice command to a set of preferences, such as the comparison made according to the instructions of the preference set comparison module 240B. For example, if the child device user 111 tends to watch movies on "Streaming Application X" or prefers to watch movies on "Streaming Application X" over "Streaming Application Y", the parent device 200 may be instructed to translate a spoken voice command of "movies" to a text command of "movies on Streaming Application X" In another example, if the child device user 111 prefers to watch cooking shows in the kitchen, the parent device 200 may be instructed to translate a spoken voice command of "cooking shows" to a text command of "play cooking show in Kitchen". In yet another example, if the child device user 111 typically identifies or selects content titles based on characters portrayed in content, the parent device 200 may be instructed to translate the voice command as such. Following the example used above, the parent device 200 may translate speech-to-text for a mermaid character's name to "'play'+'Mermaid Movie Title' on 'streaming app X'" FIG. 5 illustrates a voice command translation by a parent device according to embodiments. The command translation shown may be a process implemented as software in an application of the parent device 200/120. For example, the translation process may be a feature of a content application on the parent device 200/120 that corresponds to the same content application on a playback device 140, both being in communication with content server(s) 150. Similarly, the translation process may be a feature of a playback cloud application or speech recognition application, where both the parent device 200/120 and playback device 140 are in communication with the playback cloud server(s) 142 and speech recognition server(s) 160 respectively.

With reference to FIG. 5, a child device voice command 501 is received by preference set comparison module 540B/240B. A child device voice command 501 is received by the parent device 200 from a child device (e.g. voice input from a child device user). The child device voice command 501 is processed according to instructions of preference set comparison module 540B, which in embodiments comprises comparing the child device voice command 501 to a preference set 541B to determine a preference/tendency 502 relating to the child device voice command 501. The preference 502 is then processed according to instructions of command translation module 540C/240C, which in embodiments comprises determining a user interface (UI) command sequence 503 that corresponds to the preference 502 and that may be output by the parent device 200 as the configured translation of the child device voice command 501. Furthermore, the UI command sequence 503 translated from the voice command 501 may be specific to a transition from a current display state of the playback device to a desired display state within an application stored on the playback device. In one implementation, a voice command can be translated into a command sequence for navigating a graphical user interface (GUI) provided by the playback device 140. For example, the GUI may display a selection of content titles that can be navigated from left to right. Upon highlighting the first selection, or the left-most selection, the parent device 200 may translate, per a comparison to preferences/patterns of the child device user 111, a voice command of "no, not that one" to an associated navigation command for the playback device 140 listed in the preference set, such as "highlight: next selection" or "move highlight cursor: to the right." In embodiments, the translation performed according to the instructions of the command translation module 240C may further include any number of conditional statements that may apply different voice command to playback command sequence translations based on the current display state of the playback device. For example, different display states of a GUI for a particular content application be named or enumerated (e.g. 'home screen', 'title screen', 'recommendation screen', 'continue watching screen', 'recommended for you screen' or "screen 1, 'screen 2', etc.), and may each correspond to different command sequences when given a particular translation (e.g. "if on 'screen 2', translate voice command 1 to command sequence 4: 'return to home'+'scroll to top'+'select'", "if on 'home screen', translate voice command 1 to navigation command 5: 'scroll to top'+'select'"). In other examples, the command sequence may include the population of translated text into a search field of an application (e.g. "if on home screen, 'scroll to search field'+'enter'+'enter text: "Mermaid Movie Title"'+'enter/search'").

Returning back to FIG. 2, translated command sequence forwarding module 240D may comprise code for sending a translated command sequence to a playback device. In one embodiment, this may comprise instructions for the parent device 200/120 to send the command sequence directly to the playback device 140 directly over a local network, such as Bluetooth or WiFi. In another embodiment, the parent device 200/120 may forward the command sequence to the playback device 140 over enlarged network 160. For example, the command sequence may be sent from the parent device 200/120 to one or more server(s) over the internet, and the one or more server(s) may process the command sequence and send a signal to the playback device 140 to perform the command sequence. The one or more server(s) may include the playback cloud server(s) 142, content server(s) 150, the speech recognition server(s) 160, or any combination thereof. As one example, the appropriate sequence of navigation commands may be routed through a cloud server operated by the playback device manufacturer (e.g. playback cloud server 142). In another example, request for media content specified by the user may be routed through content server(s) 150 and then played on its corresponding application on the playback device 140. In yet another example, the translated voice command may be routed to a voice assist service running on a remote server (e.g. speech recognition server 160) using an API call, and the remote server may send a signal to the playback device 140 or to the playback cloud server 142 to initiate execution of the command sequence.

Search field population module 240E may comprise code for populating and entering auto-generated text into a search field, such as a search field of a designated application of the playback device. For example, amongst a plurality of applications stored on the playback devices for accessing content, a translated command sequence may specify that the command is a request for content that is only available on a particular content application. Therefore, the parent device 200/120 may be configured to access a search field of that particular content application and enter in the name of the content specified by the user. As an example, the user's mobile phone may be acting as a controller and keyboard for the playback device, and may submit a command sequence of: 'open content application A'+'select search field of content application A'+'enter: content title X'.

Manual-input evaluation module 240F may comprise code for evaluating manual inputs made by a user to the playback device. In embodiments, the manual-input evaluation module 240F may comprise code for identifying a plurality of manual-input commands made to the playback device 140 immediately after an executed transition from one output state to the other. The playback device may monitor inputs to the playback device 140 that were manually input by the user, such as using a playback device remote 141, and may record them in memory for analysis. For example, if a user speaks a voice command and the playback device translates the voice command to a sequence for execution by the playback device, any manual inputs made by the user after the sequence has been executed may indicate voice command was translated incorrectly, and that the user has defaulted to using manual inputs to navigate the GUI provided and reach the desired display state as originally intended. As such, the manual inputs made by the user may be recorded and linked to the voice command as well as the desired display state that is arrived at. Furthermore, manual-input evaluation module 240F may additionally include code for determining an association between manual-input playback device commands and particular voice commands analyzed and processed by the parent device, such as voice commands that are translated by the playback device and received from a child device. For example, if a voice command translated by the parent device is executed as an action to play content in a particular application, and the user instead backtracks manually to play the same or similar content in a different application, the voice command may then be linked to the application that the user backtracked to (i.e. the application in which the content is ultimately selected and launched for playback by the user) as the default for playing the content as specified. It is noted, that any number of manual inputs may be associated with various voice commands processed by the playback device. In some examples, the manual inputs may include specific cursor navigations that are applied by the user for navigating the GUI provided by the playback device and for making selections, which may be linked to voice commands spoken by the user (e.g. 'left', 'right', 'go back', 'not that one', 'yes, that one'). As such, the parent device 120 may over time improve its translations of voice commands based on the evaluation of manual-inputs made by a user in response to the voice command system's translations and executed command sequences. Command association module 240G may comprise code for associating the manual-input commands to voice commands processed by the parent device. In embodiments, this may include translated command sequence executed at the playback device just prior to the user providing the manual-inputs, such as those indicating the user correcting the playback device's actions or backtracking through the interface to achieve the display state that was intended by the spoken inputs made by the user. In embodiments, manual-input commands may be associated to voice commands automatically, or may be packaged into a suggestion to the user. For example, the parent device 200 may display a prompt to the parent device user 121 identifying the manual-input commands as a potential correction to the voice command translation and give the parent device user 121 an option to link the manual-input commands to the voice command that was spoken.

Preference set update module 240H may comprise code for updating a set of preferences for a child device user, such as preferences relating to interactions between the child device user and the playback device. In one embodiment, the update may include an association between a voice command spoken by the child device user and one or more manual-input commands made to playback device. For example, the child user 111 may speak voice command and then use a playback device remote 141 to backtrack to a different display state of the playback device 140, thus indicating that the voice command was translated incorrectly and should instead be corrected based on the user's actions when navigating back to the display state that was originally desired or intended by the user. Furthermore, in embodiments, the preference set update module 240H may provide an interface for allowing a parent device user to modify the set of preferences at any time, such as through the linking and unlinking voice commands to and from translated command sequences for the playback devices.

Command recognition module 240I may comprise code for initiating or conducting processes for recognizing voice commands. In one embodiment, the command recognition module 240I may include code for obtaining a first audio file corresponding to a voice command received from a child device and receiving a selection to link the first audio file to the command sequence for the playback device. For example, the selection may be a user input received in response to a prompt displayed to the parent device user 121 for linking the voice command to the command sequence for the playback device. In one embodiment, the prompt may specify the exact commands in the command sequence for the playback device, while in other embodiments may be a simplified description of the command sequence. For example, in some embodiments the prompt may specify the exact text search and UI navigation commands, while in other embodiments the prompt may simply describe the final output state (e.g. 'play Movie name Y' on Content Application X'). The parent device may be configured to update the set of preferences for the child device user to include the recognition link between the first audio file and a text command sequence for the playback device. The command recognition module 240I may further include code for obtaining a second audio file corresponding to the voice command received from the child device and applying the second audio file to the recognition link to determine a recognition score. To recognize the voice command in subsequent sessions, the command recognition module 240I may additionally include code for recognizing the second audio file as the voice command if the determined recognition score is above a predefined threshold (e.g. above a 70% match).

Figure 3:
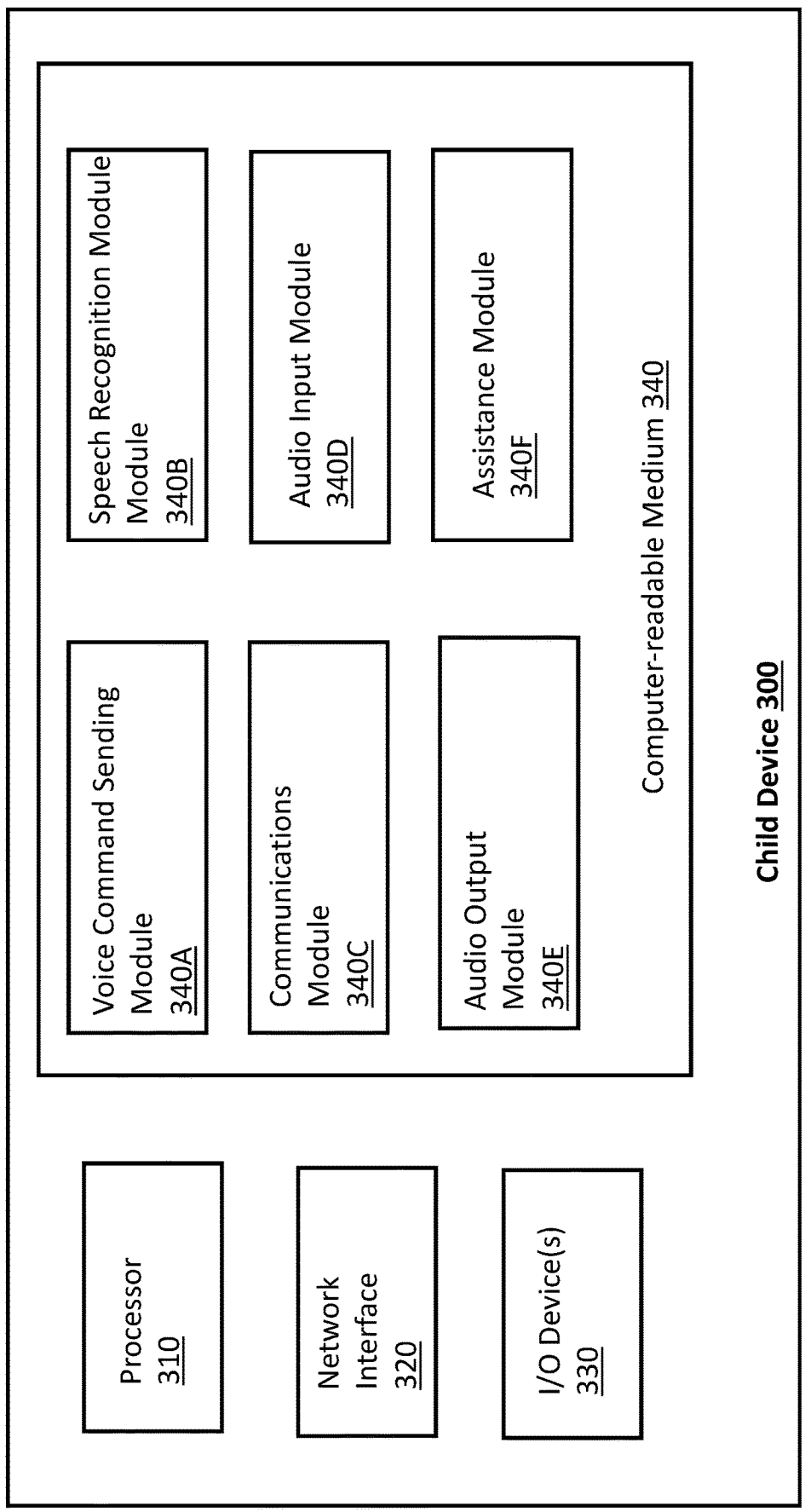
FIG. 3 illustrates a block diagram of a child device according to embodiments.

To further describe in detail the child device 110, FIG. 3 shows a block diagram of a child device according to an embodiment. The child device 300 may be the same device as child device 110 of FIG. 1. The child device 300 may comprise at least one processor 310, at least one network interface 320, one or more I/O device(s) 330, and a computer-readable medium 340. I/O device(s) 330 may include one or more hardware components allowing for input and output functionality. Examples of I/O device(s) 330 can include keyboards, microphones, display screens, touch screens, speakers, cameras, push buttons, knobs, sliders, keypads, light emitting diodes, haptic feedback devices, sensors (e.g. accelerometers, magnetometers, gyroscopes, etc.), and the like. As such, the I/O device(s) 330 allow for interaction between the child device 300 and a user of the child device 300, as well as interaction between the child device 300 and the user's environment. It is noted, that any one of the I/O device(s) 330 may be integrated either in, or otherwise programmatically or physically coupled to, the child device 300, and may further comprise one or more interfaces and drivers necessary for compatibility therewith.

Computer-readable medium 340 may be any non-transitory storage of computer code and data, such as a computer memory device. For example, the computer-readable medium 340 may include any combination of a random access memory (RAM), dynamic random access memory (DRAM), read-only memory (ROM), flash memory, external USB, hard drive, or memory card, etc. Computer-readable medium 340 may be a memory store comprising instructions that are executable by the processor 310, so as to perform a set of executable tasks. The instructions may be stored in the computer-readable medium 340 as one or more modules of code, such as voice command sending module 340A, speech recognition module 340B, communication module 340C, audio input module 350D, audio output module 340E, and assistance module 340F.

Voice command sending module 340A may comprise code for sending to a parent device (e.g. parent device 120 of FIG. 1, parent device 200 of FIG. 2) a voice command relating to control of a playback device (e.g. playback device 140 of FIG. 1). In embodiments, a parent device is configured to compare the voice command to a set of preferences for a user of the voice control device relating to the playback device. Based on the comparing, the parent device is configured to translate the voice command to a command sequence for the playback device specific to a transition of a current output state of the playback device to a desired output state within an application stored on the playback device. The playback device is further configured to send the text sequence command to the playback device. In one aspect of the computer program product, the voice command sent by the child device comprises a request from the user of the child device to access user-specified media content accessible through the playback device. In one aspect, the command sequence comprises a command to populate and enter auto-generated text into a search field within the designated application of the playback device amongst a plurality of applications stored on the playback device. The designated application of the playback device may be specifically linked to the user-specified media content by the parent device. In one aspect, the set of preferences comprises at least one preference of the user of the parent device for controlling the user of the voice control devices' access to restricted media content on the playback device. The parent device may be configured to compare the restricted media content to the user-specified media content for a match.

Speech recognition module 340B may comprise code for recognizing spoken inputs made by a user. For example, the code may comprise instructions for accessing automated speech recognition or speech-to-text services, either performed locally on the child device 300 or through a cloud-based service using an API called from the child device 300 to a remote server (e.g. speech recognition server 160 of FIG. 1).

Communications module 340C may comprise code for sending, receiving, forwarding, formatting, and reformatting messages over a network. For example, the code may comprise instructions for delivering and receiving messages over a standard communication protocol or through a particular communication channel established between the child device 300 and one or more other connected devices within a system, such as of system 100 in FIG. 1.

Audio input module 340D may comprise code for receiving an audio input. For example, the code may include instructions for activating a microphone input device of I/O device(s) 330 of child device 300 and for listening and processing sensed audio inputs upon said activation. This may be in response to a "speak" input made by the user, such as the user holding down a microphone button that activates the microphone and signals to the child device 300 that audio inputs that are to follow or that are made while or shortly after the microphone button is pressed should be processed as a spoken audio input. It is noted that the child device user may utilize other forms of "speak" input, as known in the art.

Audio output module 340E may comprise code for outputting audio. For example, the code may include instructions for activating a speaker output device of I/O device(s) 330 of child device 300 and for outputting audio through the speaker output device upon activation. Examples, of outputted audio may include music, audio book content, computer-generated spoken output (e.g. responses by a virtual assistant), to name a few.

Assistance module 340F may comprise code for providing virtual assistance to a user. For example, the code may include instructions for natural language generation and for generating audio responses that can be processed for output using instructions of audio output module 340E. In various embodiments, said natural language generation and generation of audio responses may be performed locally on the child device 300 or through a cloud-based service using an API called from the child device 300 to a remote server (e.g. playback cloud server 142 or other virtual assistance service).

Figure 4:
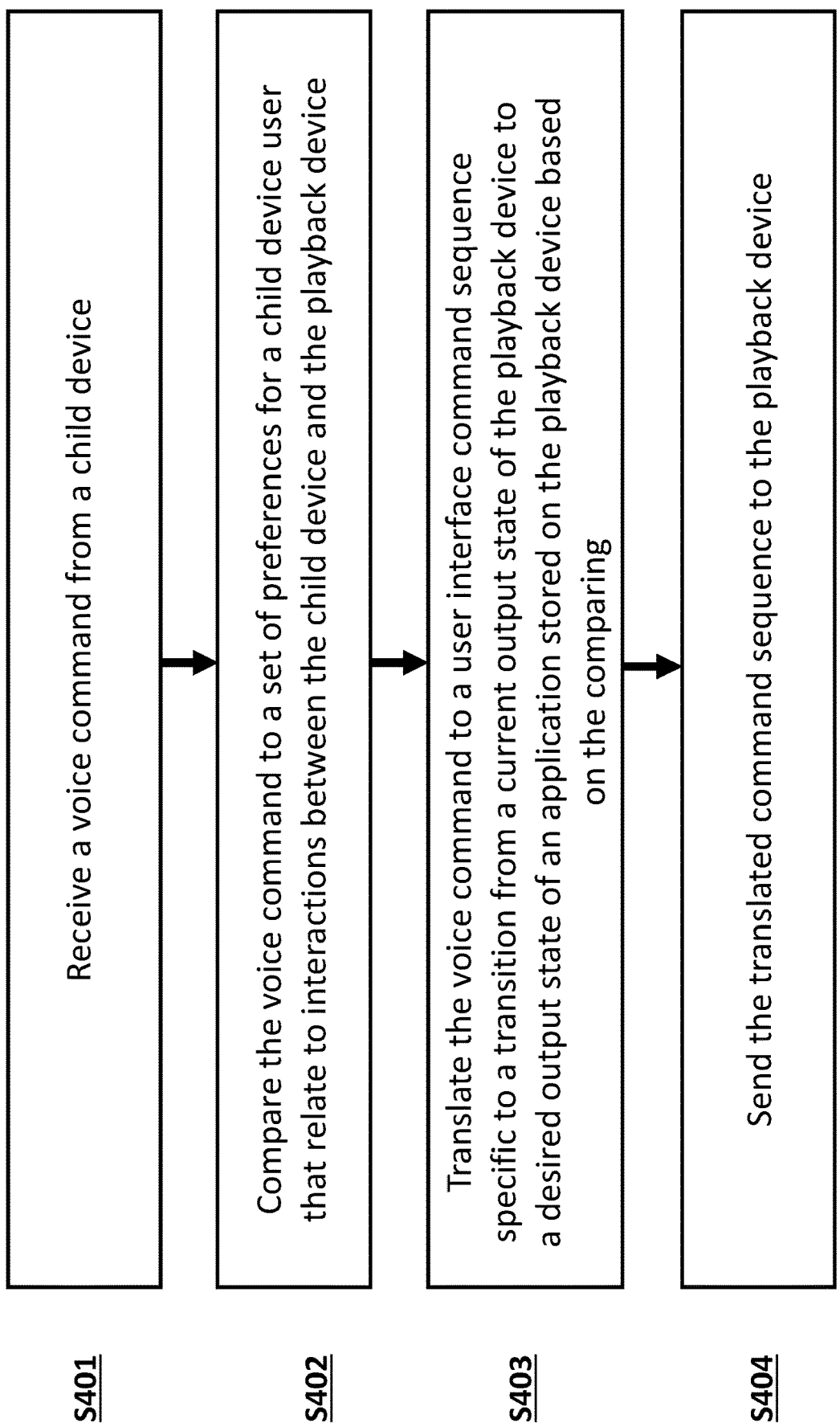
FIG. 4 depicts a flowchart illustrating a method of providing configurable control of a voice command system according to embodiments.

FIG. 4 depicts a flowchart for a method of providing configurable control of a voice command system according to embodiments.

In step 401, the parent device receives a voice command from a child device. For example, a child device user may provide spoken input to the child device so as to specify media content accessible through the playback device, and based on said spoken input, a voice command may be forwarded to the parent device. In embodiments, the spoken input may include the child device user's customized way of specifying the media content. For example, the child device user may prefer to specify content based on characters included in the content or may have some other form of shorthand describing the content. When the child device user provides the spoken input to the child device, the child device may be configured to package the spoken input as a voice command that can be forwarded to the parent device. In various embodiments, this may involve the child device performing a speech-to-text operation on sensed audio for the spoken input, either locally or in conjunction with a speech recognition server. In other embodiments, the child device may package the spoken input as a raw audio file, which the parent device may be configured to process as the voice command or to convert using speech-to-text.

In step 402, the parent device compares the voice command to a set of preferences for a child device user that relate to interactions between the child device and the playback device. For example, the set of preferences may include a mapping of voice commands to corresponding display states of the playback device or other output states of the playback device. In some examples, the output states may include audio output states, such as playing of a particular audio playlist, genre of music, audiobook, etc. In other examples, the output state may include machine states of a IOT device, such as for performing tasks (e.g. making coffee, ordering food, turning on a vehicle, commanding a vehicle to pick up the user, etc.). In other examples, the output state may include a combination of display, audio, and/or machine states of a playback device or a combination of output states for a plurality of playback devices. For example, the output states may include a combination of a display state within a content application, an audio state of a surround speaker system (e.g. output channel, volume, setting, etc.), and a brightness level of a connected light system (e.g. 'dim lights 80%'). Through the comparison of the voice command to the set of preferences for the child device user, the parent device is able to infer/determine the intended command of the child device user with respect to the playback device, even though the child device user's voice command does not adhere to the voice command conventions of the playback device.

In step 403, the parent device translates the voice command to a translated command sequence specific to a transition from a current output state of the playback device to a desired output state of an application stored on the playback device based on the comparing that was performed at step 402. The command sequence translation may include various UI navigation commands and playback commands processable by the playback device, such as text inputs, UI element selections, cursor commands, etc. A combination of UI navigation commands and playback commands required for transitioning to the desired output state preferred by the user may be determined. The application on which the desired output state is preferred by the user may be a designated application amongst a plurality of applications stored on the playback device, and the UI navigation commands and playback commands may be commands specific to the designated application and its UI. For example, the voice command may be a request for specific media content desired for consumption by the child device user, and the media content may be specifically linked with a particular content application through which the media content is available and distributed and selectable for playback through a UI. In other examples, the designated application may be a particular application for completing a task pertaining to the voice command. For example, the desired output state may be an order for a service that is provided through the designated application, such as ordering a good or service for purchase through the designated application.

In step 404, the parent device sends the translated command sequence to the playback device. As such, the playback device may execute the translate command sequence to achieve the desired output state intended by the child device user. For example, the voice command received from the child device may pertain to a desired display of movie content featuring the child device user's favorite actor or featuring the child device user's favorite character. The child device user may only speak the actor's name without providing any further context, as required by the conventions of the playback device. However, the parent device may translate the child device user's spoken input, or voice command relating thereto, so as to identify the proper commands executable by the playback device that need to be performed in sequence to achieve the desired output state. In this particular example, the voice command may be mapped to the content application predominately featuring content containing the actor or character or featuring the child device user's favorite movie containing said actor. Furthermore, the parent device may identify that a search for the actor or character must be entered into a search field within the content application. As such, the parent device may send a command sequence of: 'open content application X', +'navigate to search field'+'enter search field'+'populate text "character's name"'+'enter', which when executed by the playback device will transition the display state of the playback device, or display state of the output device coupled to the playback device, to the desired output state intended by the child device user.

Embodiments described herein provide a number of technical advantages over the prior art. In the embodiments described, a user is able to customize interactions with a voice command in a more intuitive way. For example, the user may adjust a playback device and output device to respond according to user behavior rather than based on standard voice command conventions provided as part of a traditional VUI, such as the strict conventions established by the manufacturers and providers of traditional voice command devices. Furthermore, embodiments allow users to control how a voice command system responds to guest users/child device users that interact with a voice command system owned by a main user/parent user. As a result, the user has greater control over how the voice command system responds to inputs, so as to provide a more user friendly experience, in particular, for novice users, adolescent users, or other users that are not familiar with what inputs a voice command system expects or whose interaction with the system may be restricted in use by the parent user.

In one aspect, a method is provided. The method may comprise receiving, by a parent device, a voice command from a child device and comparing the voice command to a set of preferences for a child device user, where the set of preferences may relate to one or more interactions between the child device and a playback device. The method may further comprise the parent device translating the voice command to a text command sequence specific to a transition from a current display state of the playback device to a desired display state within an application stored on the playback device based on the comparing, and sending the text command sequence to the playback device.

In one aspect, the voice command from the child device comprises a request from the child device user to access user-specified media content accessible through the playback device.

In one aspect, the text command sequence comprises a command to populate and enter auto-generated text into a search field within a designated application of the playback device amongst a plurality of applications stored on the playback device. The designated application of the playback device may be specifically linked to the user-specified media content by the parent device.

In one aspect, the set of preferences comprises at least one preference of a parent device user for controlling the child device user's access to restricted media content on the playback device, and the parent device is configured to compare a list of restricted media content to the user-specified media content for a match.

In one aspect, after sending the text command sequence to the playback device, the method further comprises identifying a plurality of manual-input commands made to the playback device immediately after execution of the transition to the desired display state. The parent device determines an association between one or more manual-input commands in the plurality of manual-input commands made to the playback device and the voice command received from the child device, and the parent device updates the set of preferences for the child device user to include the association between the one or more manual-input commands and the voice command received from the child device.

In one aspect, the method further comprises the parent device obtaining a first audio file corresponding to the voice command received from the child device and receiving a selection to link the first audio file to the text command sequence for the playback device. The parent device updates the set of preferences for the child device user to include a recognition link between the first audio file and the text command sequence for the playback device.

In another aspect, the method further comprises obtaining a second audio file corresponding to the voice command received from the child device and applying the second audio file to the recognition link to determine a recognition score. The parent device recognizes the second audio file as the voice command if the determined recognition score is above a predefined threshold.

In another aspect, a system is provided in order to provide configurable voice control. The system includes a parent device comprising a processor, a network interface, and a non-transitory computer-readable medium storing program code executable by the processor. The program code comprises instructions to receive a voice command from a child device and compare the voice command to a set of preferences for a child device user. The set of preferences relates to one or more interactions between the child device and a playback device. The program code further includes instructions for translating the voice command to a text command sequence specific to a transition from the current display state of the playback device to a desired display state within an application stored on the playback device based on the comparing, and instructing the parent device to send the text command sequence to the playback device.

In one aspect of the system, the voice command from the child device comprises a request from the child device user to access user-specified media content accessible through the playback device.

In one aspect of the system, the text command sequence comprises a command to populate and enter auto-generated text into a search field within a designated application of the playback device amongst a plurality of applications stored on the playback device. The designated application of the playback device may be specifically linked to the user-specified media content by the parent device.

In one aspect of the system, the set of preferences comprises at least one preference of a parent device user for controlling the child device user's access to restricted media content on the playback device, and the parent device is configured to compare the restricted media content to the user-specified media content for a match. If there is a match, then the parent device may translate the voice command to an output state defined in the set of preferences by the parent device user and forward to the playback device, which may include, for example, displaying/selecting non-restricted media content, returning to the home screen, or sending an invalid command sequence to the playback device that will cause the playback device VUI to respond with an error message (e.g. "sorry, I could not find that" or "sorry, I do not understand.").

In one aspect of the system, the parent device program code further comprises instructions to identify a plurality of manual-input commands to the playback device after sending the text command sequence to the playback device. In particular, the manual-input commands are commands made to the playback device immediately after execution of the transition to the desired display state. The program code further includes instructions to determine an association between one or more manual-input playback device commands in the plurality of manual-input playback device commands and the voice command from the child device. The program code further includes instructions for the parent device to update the set of preferences for the child device user to include the association.

In one aspect of the system, the program code of the parent device further comprises instructions to obtain a first audio file corresponding to the voice command received from the child device and receive a selection from the parent device user to link the first audio file to the text command sequence for the playback device. The program code further includes instructions for the parent device to update the set of preferences for the child device user, so as to include a recognition link between the first audio file and the text command sequence for the playback device.

In another aspect of the system, the program code of the parent device further comprises instructions to obtain a second audio file corresponding to the voice command received from the child device, apply the second audio file to the recognition link to determine a recognition score, and recognize the second audio file as the voice command if the determined recognition score is above a predefined threshold.

In one aspect, the system further comprises the child device.

In one aspect, the system further comprises the playback device.

In yet another aspect, a computer program product comprises a non-transitory computer readable storage device having a computer readable program stored thereon. The computer readable program when executed on a computer causes the computer to send to a parent device a voice command relating to control of a playback device. The parent device is configured to compare the voice command to a set of preferences for a user of the voice control device relating to the playback device. Based on the comparing, the parent device is configured to translate the voice command to a text sequence command for the playback device specific to a transition of a current display state of the playback device to a desired display state within an application stored on the playback device. The playback device is further configured to send the text sequence command to the playback device.

In one aspect of the computer program product, the voice command sent by the voice control device comprises a request from the user of the voice control device to access user-specified media content accessible through the playback device.

In one aspect of the computer program product, the text command sequence comprises a command to populate and enter auto-generated text into a search field within the designated application of the playback device amongst a plurality of applications stored on the playback device. The designated application of the playback device may be specifically linked to the user-specified media content by the parent device.

In one aspect of the computer program product, the set of preferences comprises at least one preference of the user of parent device for controlling the user of the voice control devices' access to restricted media content on the playback device. The parent device may be configured to compare the restricted media content to the user-specified media content for a match.

The processes described herein may be implemented in a specialized processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium, e.g., computer readable storage device, capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a specialized, general, multi-purpose, or single purpose processor as described above. For example, a computer may be a desktop computer, laptop, smartphone, tablet device, set top box, etc.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

What is claimed is:

1. A method of providing configurable control in a voice command system, the method comprising:
   receiving a voice command;
   comparing the voice command to a set of preferences for a user, the set of preferences relating to one or more interactions between the user and a playback device;
   based on the comparing, translating the voice command to a user interface command sequence specific to an output transition from a current output state of the playback device to a desired output state of a designated application amongst a plurality of applications stored on the playback device; and
   sending the user interface command sequence to the playback device, wherein the playback device executes the user interface command sequence.

2. The method of claim 1, wherein the voice command from comprises a request from the user to access user-specified media content accessible through the playback device, and wherein the designated application is specifically linked to the user-specified media content.

3. The method of claim 1, wherein the user interface command sequence comprises a command to populate and enter auto-generated text into a search field within the designated application.

4. The method of claim 1, wherein the set of preferences comprises at least one preference for controlling an access of the user to restricted media content of the playback device.

5. The method of claim 1, further comprising:
   after sending the user interface command sequence to the playback device, identifying a plurality of manual-input commands made to the playback device immediately after execution of the user interface command sequence by the playback device;
   determining an association between one or more manual-input commands in the plurality of manual-input commands made to the playback device and the voice command; and
   updating the set of preferences for the user to include the association between the one or more manual-input commands and the voice command.

6. The method of claim 1, further comprising:
   obtaining a first audio file corresponding to the voice command;
   receiving a selection to link the first audio file to the desired output state; and updating the set of preferences for the user to include a recognition link between the first audio file and the desired output state.

7. The method of claim 6, further comprising:
obtaining a second audio file corresponding to the voice command;
applying the second audio file to the recognition link to determine a recognition score; and
recognizing the second audio file as linked to the desired output state if the determined recognition score is above a predefined threshold.

8. The method of claim 1, wherein the voice command is received by a parent device from a child device, and wherein the user is a child device user.

9. A system for providing configurable voice control, the system comprising:
a parent device, the parent device comprising a processor, a network interface,
and a non-transitory computer-readable medium comprising program code executable by the processor, the program code comprising instructions to:
receive a voice command from a child device;
compare the voice command to a set of preferences for a child device user, the set of preferences relating to one or more interactions between the child device user and a playback device;
based on the comparison, translating the voice command to a user interface command sequence specific to a output state transition from a current output state of the playback device to a desired output state of a designated application amongst a plurality of applications stored on the playback device; and
sending the user interface command sequence to the playback device, wherein the playback device executes the user interface command sequence.

10. The system of claim 9, wherein the voice command from the child device comprises a request from the child device user to access user-specified media content accessible through the playback device, and wherein the designated application is specifically linked to the user-specified media content.

11. The system of claim 9, wherein the user interface command sequence comprises a command to populate and enter auto-generated text into a search field within the designated application.

12. The system of claim 9, wherein the set of preferences comprises at least one preference of a parent device user for controlling an access of the child device user to a restricted device feature of the playback device.

13. The system of claim 9, wherein the program code of the parent device further comprises instructions to:
after sending the user interface command sequence to the playback device, identifying a plurality of manual-input commands made to the playback device immediately after execution of the user interface command sequence by the playback device;
determine an association between one or more manual-input commands and the voice command from the child device; and
update the set of preferences for the child device user to include the association between the one or more manual-input commands and the voice command.

14. The system of claim 9, wherein the program code of the parent device further comprises instructions to:
obtain a first audio file corresponding to the voice command received from the child device;
receive a selection to link the first audio file to the desired output state; and
update the set of preferences for the child device user, to include a recognition link between the first audio file and the desired output state.

15. The system of claim 14, wherein the program code of the parent device further comprises instructions to:
obtain a second audio file corresponding to the voice command received from the child device;
apply the second audio file to the recognition link to determine a recognition score; and
recognize the second audio file as linked to the desired output state if the determined recognition score is above a predefined threshold.

16. The system of claim 9, further comprising the child device.

17. The system of claim 9, further comprising the playback device.

18. A non-transitory computer program product comprising instructions configuring a voice control device to:
receive a voice input from a user;
generate, from the voice input, a voice command relating to control of a playback device; and
send the voice command to a parent device, wherein the parent device is configured to:
compare the voice command to a set of preferences relating to interactions between the user and the playback device;
based on the comparing, translate the voice command to a user interface command sequence specific to an output state transition from a current output state of the playback device to a desired output state of a designated application amongst a plurality of applications stored on the playback device, and
send the user interface command sequence to the playback device, wherein the playback device executes the user interface command sequence.

19. The non-transitory computer program product of claim 18, wherein the voice command generated by the voice control device comprises a request from the user to access user-specified media content accessible through the playback device, and wherein the user-specified media content is specifically linked to the designated application.

20. The non-transitory computer program product of claim 18, wherein the user interface command sequence comprises a command to populate and enter auto-generated text into a search field within the designated application.

* * * * *